(No Model.)
S. A. MORSE.
DUMB WAITER.
No. 311,253. Patented Jan. 27, 1885.
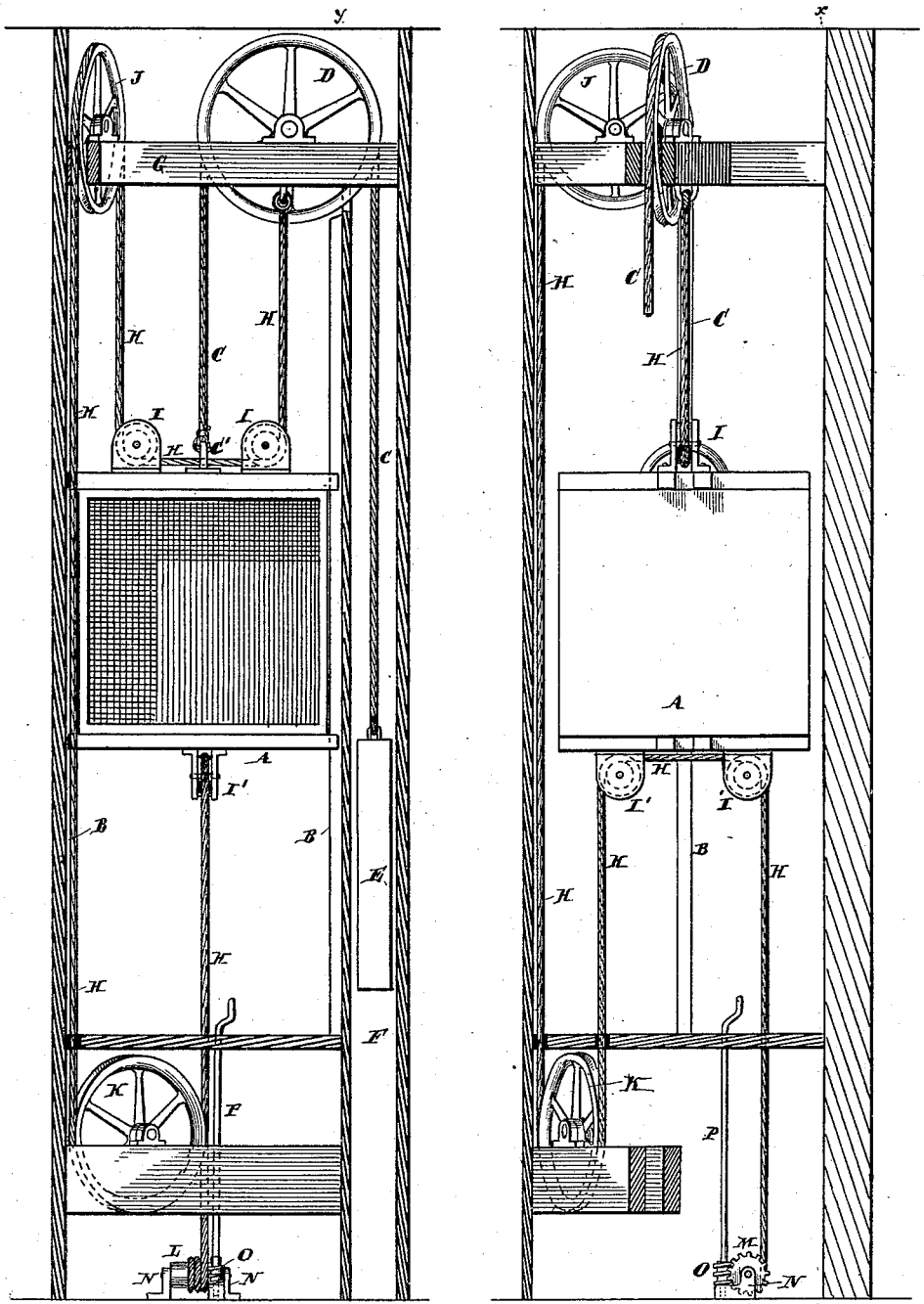

UNITED STATES PATENT OFFICE.

STEPHEN A. MORSE, OF PHILADELPHIA, PENNSYLVANIA.

DUMB-WAITER.

SPECIFICATION forming part of Letters Patent No. 311,253, dated January 27, 1885.

Application filed October 30, 1884. (No model.)

*To all whom it may concern:*

Be it known that I, STEPHEN A. MORSE, of the city and county of Philadelphia and State of Pennsylvania, have invented a new and useful Improvement in Dumb-Waiters, of which the following is a specification.

My invention has reference to dumb-waiters; and it consists in certain improvements by which the cord for raising or lowering a dumb-waiter may be kept taut, the object of which is to prevent loose rope passing around the various sheaves or pulleys, and thereby overcome any tendency of the said rope to work off the peripheries of said sheaves, causing derangement of the dumb-waiter and rendering it inoperative, the said looseness in the rope being due to expansion produced either by usage or variations in the temperature and hydrometric condition of the atmosphere, and in details of construction, all of which is fully set forth in the following specification and shown in the accompanying drawings, which form part thereof.

In the drawings, Figure 1 is a sectional elevation of a dumb-waiter, embodying my improvement, on line X X. Fig. 2 is also a side elevation of same, taken on line Y Y. Fig. 3 is a sectional elevation of one of the sheaves or guide-pulleys secured to the dumb-waiter cage.

A is a cage. B are the guides secured to the opposite walls of the vertical passage-way. C is a rope attached to the top of the cage, and passes over a sheave, D, supported upon timber G at the top, and passes down and is secured to a counterbalance-weight, E, which is guided in a passage-way, F. H is a rope or cord secured at one end to the frame G, then passes down and around to sheaves I, secured to the top of the cage A, then upward and over a sheave, J, then downward (being brought to the front of the cage for convenience in operating the same) and around a sheave, K, at the bottom, then upward and around two sheaves, I' I', on the bottom of the cage similar to those I I on the top, but arranged at right angles thereto, then downward, and secured to a drum, L, carried in a frame, N, and provided with a worm-wheel or gear, M. Into this worm-wheel M a worm, O, meshes, and is rotated by a crank, P, which extends upward a sufficient distance to be operated by hand.

The arrangement of the rope H and sheaves is substantially the same both at the top and bottom, the single exception being that the upper end is secured to the frame G, while the lower end is secured to the take-up drum L; but it is self-evident that this take-up might be placed at the upper end in place of the lower end, or there may be one placed at both ends, if desired.

When the sheaves I I' are made of metal, they are apt to become dry and produce a very disagreeable squeaking sound, to obviate which I construct them as shown in Fig. 3, in which $I^2$ is a cast-iron sheave having a square hole, $I^3$, formed in its center, into which a square block, R, of lignum-vitæ, previously well seasoned, is driven, and through which the axle-pin S is passed to hold the said sheave in its bearings T. The lignum-vitæ overcomes the necessity of oiling, and in this connection will run an indefinite period of time without material wear, and the hardest usage will not produce any disagreeable noises. This is particularly advantageous owing to the fact that there are four of said sheaves secured to the single cage.

While I prefer the exact construction of take-up device shown, as it is extremely simple and cannot run down, yet I do not limit myself thereto, as it may be modified without departing from my invention. The arrangement of the actuating-cord is substantially similar to that shown in United States Patent No. 30,831, and dated December 4, 1860; but in that construction the sheaves I I and I' I' were respectively secured to the same blocks or base, which had to be made longer or shorter with varying width of the cage. The necessity for this change lies in the fact that the sheaves J and K are made in fixed sizes, and they cannot be so located without much trouble and expense as to prevent the sheaves I I and I' I' being placed, respectively, a greater or less distance apart and yet insure the cord H running vertically. To overcome this I make the frame of the pulleys or sheaves separate and secure them to the top and bottom of the cage A, or to frames secured thereto, and cause the cord to pass from one sheave I to the other through a loop, C', to which the counterbalance cord or rope is secured, so that it may act upon the center of the cage and yet allow the passage of the cord also through the center. This feature simplifies the construction and reduces the expense, and allows the sheaves to be sent to the place where the dumb-waiter is to be put without having to take the dimensions of the cage and then make a special pattern for each case.

I claim—

1. The combination of the dumb-waiter cage and its carriage-operating cord, one end of which is secured to a rigid support, with a take-up cylinder, to which the other end of the cord is secured, and devices to rotate said cylinder and prevent its running down, which consist of a worm and worm-wheel, substantially as and for the purpose specified.

2. The combination of cage A, cord H, pulleys I J K I', cylinder L, and suitable devices, consisting of drum worm and worm-wheel, to rotate said cylinder and keep it from running down, substantially as and for the purpose specified.

3. The combination of cage A, rope C, sheaves D, weight E, cord H, pulleys I J K I', cylinder L, having worm-wheel M, worm O, and long vertical crank P, substantially as and for the purpose specified.

4. The combination of cage A, separate pulleys I I', loop C', rope C, weight E, sheaves D J K, and rope H, substantially as and for the purpose specified.

In testimony of which invention I have hereunto set my hand.

STEPHEN A. MORSE.

Witnesses:
R. M. HUNTER,
ANDREW ZANE, Jr.